(12) United States Patent
Czlapinski

(10) Patent No.: US 9,694,644 B2
(45) Date of Patent: Jul. 4, 2017

(54) ACTIVE CONTROL OF TRAILER PITCH

(71) Applicant: International Truck Intellectual Property Company, Lisle, IL (US)

(72) Inventor: Craig Robert Czlapinski, Westchester, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 381 days.

(21) Appl. No.: 14/527,386

(22) Filed: Oct. 29, 2014

(65) Prior Publication Data

US 2016/0121684 A1 May 5, 2016

(51) Int. Cl.
| | |
|---|---|
| *B60G 17/016* | (2006.01) |
| *B62D 35/00* | (2006.01) |
| *B62D 53/06* | (2006.01) |
| *B60G 17/015* | (2006.01) |
| *B60G 17/027* | (2006.01) |

(52) U.S. Cl.
CPC ....... *B60G 17/016* (2013.01); *B60G 17/0155* (2013.01); *B60G 17/0275* (2013.01); *B60G 2300/042* (2013.01); *B60G 2400/204* (2013.01); *B60G 2400/252* (2013.01); *B60G 2500/30* (2013.01); *B62D 35/001* (2013.01)

(58) Field of Classification Search
CPC .............. B60G 17/016; B60G 17/0155; B60G 17/0275; B60G 2500/30; B60G 2300/042; B60G 2400/204; B60G 2400/252; B60G 17/0165; B60G 17/017; B60G 17/0164; B60G 17/0161; B62D 35/001

USPC ............................................ 280/6.157, 6.159
See application file for complete search history.

(56) References Cited

U.S. PATENT DOCUMENTS

| | | | | |
|---|---|---|---|---|
| 4,568,101 A * | 2/1986 | Bleustein | ........... | B60G 17/0152 180/219 |
| 5,094,503 A * | 3/1992 | Dare-Bryan | ......... | B62D 35/001 105/1.1 |
| 5,684,698 A | 11/1997 | Fujii | | |
| 6,431,557 B1 | 8/2002 | Terborn | | |
| 7,765,044 B2 * | 7/2010 | Neuburger | ........... | B62D 35/001 296/180.1 |
| 7,789,412 B2 * | 9/2010 | Alguera | ............... | B62D 35/001 280/407 |
| 7,862,102 B1 * | 1/2011 | Benton | ................ | B62D 35/001 296/180.1 |
| 8,205,932 B1 * | 6/2012 | Houk | ................... | B62D 35/001 296/180.4 |
| 8,342,556 B2 | 1/2013 | Oriet | | |
| 8,573,680 B2 | 11/2013 | Smith | | |
| 8,801,076 B2 * | 8/2014 | White, Sr. | ........... | B62D 35/001 296/180.1 |
| 8,870,265 B2 * | 10/2014 | Smith | .................. | B62D 35/001 296/180.4 |
| 8,925,475 B2 * | 1/2015 | Harbin | ................... | B63B 29/00 114/273 |
| 8,926,001 B2 * | 1/2015 | Ballarin | ............... | B62D 35/001 296/180.4 |

(Continued)

*Primary Examiner* — Paul N Dickson
*Assistant Examiner* — Joselynn Y Sliteris
(74) *Attorney, Agent, or Firm* — Jeffrey P. Calfa; Mark C. Bach

(57) ABSTRACT

Pitch of a trailer being towed by a tractor along a roadway is controlled to reduce aerodynamic drag.

9 Claims, 3 Drawing Sheets

(56) References Cited

U.S. PATENT DOCUMENTS

| | | | |
|---|---|---|---|
| 2005/0242532 A1* | 11/2005 | Deo | B60G 13/005 |
| | | | 280/5.5 |
| 2008/0217957 A1 | 9/2008 | Schoon | |
| 2013/0187405 A1 | 7/2013 | Ballarin | |
| 2016/0016616 A1* | 1/2016 | Bacon | B62D 35/001 |
| | | | 296/180.4 |
| 2016/0052566 A1* | 2/2016 | Bacon | B62D 35/001 |
| | | | 296/180.4 |

* cited by examiner

ACTIVE CONTROL OF TRAILER PITCH

FIELD OF THE DISCLOSURE

This disclosure relates to a highway tractor-trailer, particularly to active control of trailer pitch as the tractor tows the trailer along a roadway.

BACKGROUND OF THE DISCLOSURE

A typical undercarriage of a highway tractor comprises a suspension system which includes suspension of an axle, such as a rear axle, from an undercarriage component, such as a chassis frame. The suspension system absorbs road-induced impacts as the highway tractor travels along a roadway, thereby contributing to quality of ride and handling.

One type of suspension system is a pneumatic suspension system which has gas springs on right and left sides of an axle for absorbing vertical road forces imposed on the axle through the axle's wheels. A gas spring typically has a single point of attachment to an undercarriage, but it may be coupled with an axle through various mechanical configurations, one example of which is a trailing arm.

A trailing arm has a proximal end having a point of mounting on a chassis frame which allows the trailing arm to swing up and down about an axis which is perpendicular to the length of the tractor, toward and away from the chassis frame. A housing of the axle is fastened to the trailing arm at a location rearward of that axis. An upper end of a gas spring has a point of attachment to the chassis frame. A lower end of the gas spring has a point of attachment either to the axle or to the trailing arm. The gas spring will contract axially as the axle swings toward the chassis frame and will expand axially as the axle swings away from the chassis frame.

Any given suspension system may have additional components or mechanisms that perform specific functions such as aiding in maintenance of proper alignment of the axle to the undercarriage.

Certain pneumatic suspensions may provide control of ride height, meaning that they can set a nominal distance of the axle from the chassis frame when the tractor is parked. That distance may be set at any distance within a range of distances using ride height position sensors to measure ride height. When the tractor is moving, the gas springs still absorb vertical road forces imposed on the axle through the axle's wheels riding along a roadway.

When the medium within a gas spring is air, an on-board air compressor can be operated through a control system to increase the quantity of air in the spring, thereby increasing ride height. Bleeding air from the spring decreases ride height.

The wake of a moving tractor-trailer imposes aerodynamic drag on the tractor-trailer as it travels along a roadway with the drag increasing as travel speed increases. Various known methods and devices are currently used to reduce drag. Some involve installing components which may inhibit tractor or trailer usability or change the shape of a trailer in a way which reduces its usable cargo volume.

SUMMARY OF THE DISCLOSURE

This disclosure introduces a trailer pitch control which can achieve meaningful drag reduction without incurring the adverse effects which may characterize known drag-reduction methods and devices. The disclosed trailer pitch control can achieve that result without adding significant cost to a tractor-trailer which already has a gas spring suspension with ride height adjustment, and it can do so without impairing pre-existing usability of a tractor-trailer and without sacrificing trailer cargo volume.

Briefly, the disclosed trailer pitch control reduces drag by actively changing the pitch of the trailer through adjustment of the suspension ride heights for tractor tandem drive axles and/or trailer bogies. The pitch adjustment for reducing drag causes the trailer to slope more downwardly from front to rear at higher travel speeds than at lower speeds, meaning that the pitch angle is increased. Pitch control can be accomplished: 1) in the tractor alone, or 2) in the trailer alone, or 3) in both tractor and trailer.

Accordingly one general aspect of the present disclosure relates to a tractor-trailer comprising a tractor and a trailer which is towed by the tractor.

The tractor comprises a tractor chassis having a tractor chassis frame, right and left front wheels suspended from the tractor chassis frame, and right and left rear wheels suspended from the tractor chassis frame by a tractor rear suspension.

The trailer comprises a trailer chassis frame, right and left rear wheels which are suspended from the trailer chassis frame by a trailer rear suspension.

A coupling couples the trailer to the tractor chassis frame at a location overlying the right and left rear wheels of the tractor for towing of the trailer by the tractor.

At least one of the rear suspensions comprises at least one gas spring which is compressed along an axis by motion of at least one of its rear wheels toward its chassis frame and which expands along the axis with motion of at least one of its rear wheels away from its chassis frame.

A ride height control sets ride height of at least one of the rear suspensions to a desired ride height within a range of ride heights by setting internal pressure of at the least one gas spring.

A trailer pitch control controls pitch of the trailer by setting ride height of the at least one of the rear suspensions as a function of speed of travel of the tractor-trailer.

Another general aspect relates to a method for setting pitch of a trailer being towed by a tractor by causing a ride height control to set ride height of a suspension which increases trailer pitch from a baseline when the tractor and trailer are traveling at a speed greater than a speed threshold and which returns trailer pitch to the baseline when speed of the tractor and trailer becomes less than the speed threshold.

The foregoing summary, accompanied by further detail of the disclosure, will be presented in the Detailed Description below with reference to the following drawings that are part of this disclosure.

DETAILED DESCRIPTION

Figure 1:
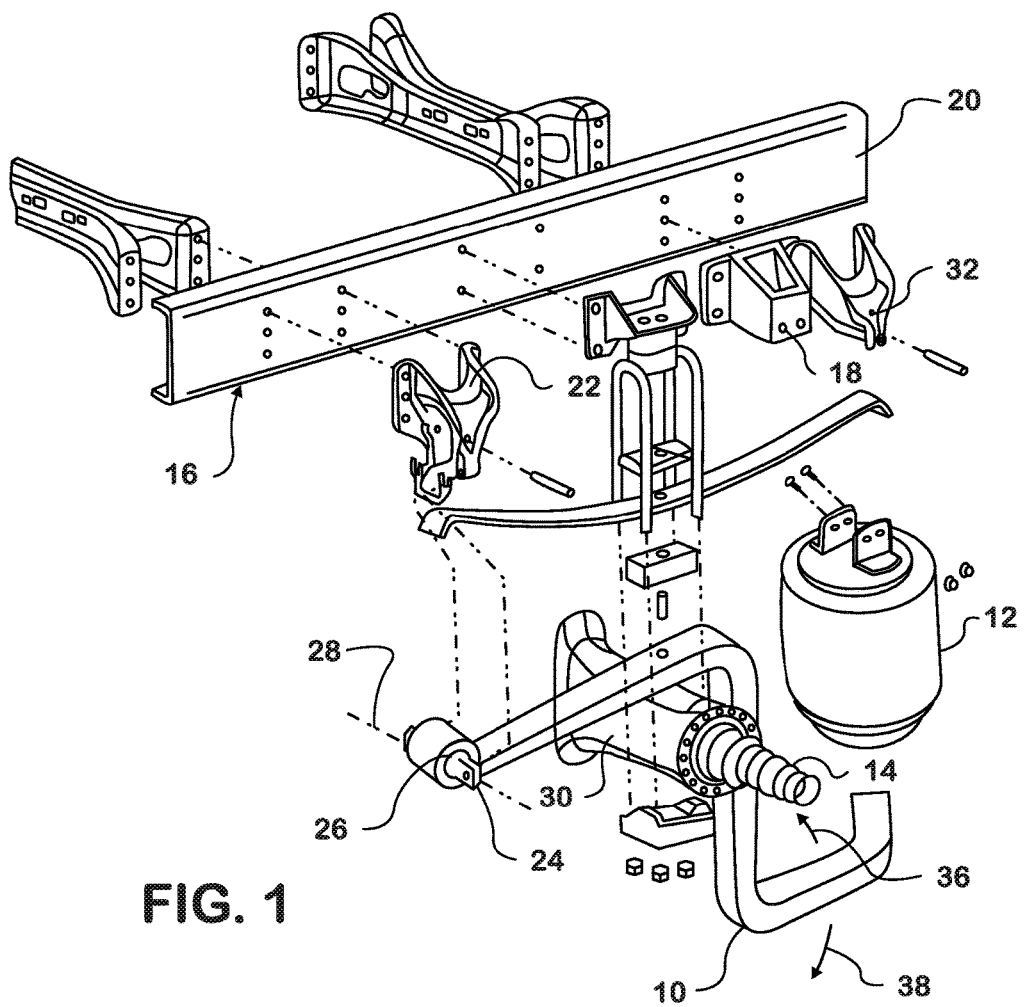
FIG. 1 is an exploded perspective view of a left rear suspension for suspending a rear axle from a chassis frame.

Commonly owned U.S. Pat. No. 8,573,620 illustrates one example of a pneumatic suspension system and is incorporated herein by reference. FIG. 1 of the present application shows components of the system shown in FIG. 1 of U.S. Pat. No. 8,573,620 including a trailing arm 10 and a gas spring 12 which collectively suspend an axle 14 from a vehicle undercarriage which comprises a chassis frame 16. The one component which is common all pneumatic suspension systems regardless of specific type is gas spring 12. Trailing arm 10 is representative of a trailing arm type suspension.

A lower end of gas spring 12 is fastened to a distal end of trailing arm 10. An upper end of gas spring 12 is fastened via a bracket 18 to a side rail 20 of chassis frame 16.

Trailing arm 10 has a proximal end which is mounted on side rail 20 forwardly of axle 14 via a bracket 22. A bushing is fit to a shaft 24 which is fit within an eye 26 at the proximal end of trailing arm 10. Exposed ends of shaft 24 are fastened to bracket 22. That arrangement allows trailing arm 10 to swing up and down on chassis frame 16 about a horizontal axis 28 of eye 26 which is perpendicular to the length of side rail 20.

From its proximal end, trailing arm 10 is initially straight, extending toward the rear of chassis frame 16 more horizontally than vertically to a location beyond axle 14 where it extends vertically downward to a location from which it extends further rearward to a distal end where it bends inward to fasten with gas spring 12.

As explained in U.S. Pat. No. 8,573,620, various components fasten a housing 30 of axle 14 to trailing arm 10 while other components associate a chassis-mounted locating strap 32 with trailing arm 10.

With trailing arm 10 mounted on chassis frame 16 for swinging motion about axis 28, gas spring 12 will compress axially as axle 14 swings toward chassis frame 16 as suggested by arrow 36 and will expand axially as axle 14 swings away from chassis frame 16 as suggested by arrow 38.

Figure 2:
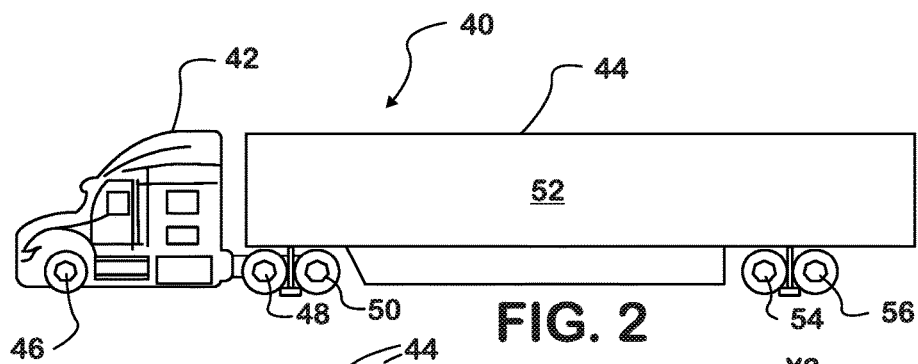
FIG. 2 is a side elevation view of a tractor-trailer showing a baseline setting of suspension ride heights of axles of the tractor-trailer.

FIG. 2 is a left side view of a tractor-trailer 40 comprising a highway tractor 42 and a trailer 44. Tractor 42 comprises a tractor chassis having a tractor chassis frame, right and left front wheels 46 for steering tractor 42, and a tandem rear drive axle having right and left tandem drive wheels 48, 50 for propelling tractor 42. A suspension such as the one described in FIG. 1 suspends the tandem rear drive axle from right and left sides of the tractor chassis frame and comprises right and left gas springs each of which is compressed along an axis by motion of the tandem rear drive axle toward the tractor chassis frame and which expands along the axis with motion of the tandem rear drive axle away from the tractor chassis frame.

Tractor 42 further comprises a ride height control for setting ride height of the tandem rear drive axle suspension to a desired ride height within a range of ride heights by setting internal pressure of the suspension's gas springs. When the medium within the gas springs is air, an on-board air compressor can be operated by the ride height control to increase the quantity of air in the gas springs, thereby increasing ride height. Bleeding air from the gas springs decreases ride height.

Tractor 42 also has a trailer pitch control which controls pitch of trailer 44 by setting ride height of the suspension of the tandem rear drive axle of tractor 42 as a function of speed of travel of tractor-trailer 40.

Trailer 44 is towed by tractor 42 via a coupling to the tractor chassis frame which overlies the tandem rear drive axle of tractor 42. An example of a common coupling is a fifth wheel supported on the chassis frame of a tractor.

Trailer 44 comprises a body 52 mounted on a chassis frame. A forward portion of the chassis frame which couples trailer 44 to tractor 42 overlies the tandem rear drive axle of tractor 42. A rear portion of the chassis frame of trailer 44 is supported on an underlying roadway by a tandem axle bogie comprising right and left rear tandem wheels 54, 56. A suspension such as the one described in FIG. 1 for example suspends the tandem axle bogie from right and left sides of the trailer chassis frame and comprises right and left gas springs each of which is compressed along an axis by motion of the bogie toward the trailer chassis frame and which expands along the axis with motion of the bogie away from the trailer. A tandem axle bogie is just one of various possible rear axle configurations for a trailer. Other configurations include a single axle and tandem dual axles which are independently suspended.

Regardless of axle configuration, when a trailer's rear axle suspension has one or more gas springs for adjusting the suspension's ride height, they can become an element of trailer pitch control. The same is true for the suspension of a tractor rear drive axle. Decreasing ride height of a trailer's rear axle suspension can change trailer pitch by making the trailer roof slope more downwardly from front to rear. Increasing ride height of a tractor's rear drive axle suspension can also make the trailer roof slope more downwardly from front to rear.

FIG. 2 portrays a baseline setting for trailer pitch. FIG. 2 and the following three Figs. are not necessarily to scale.

Figure 3:
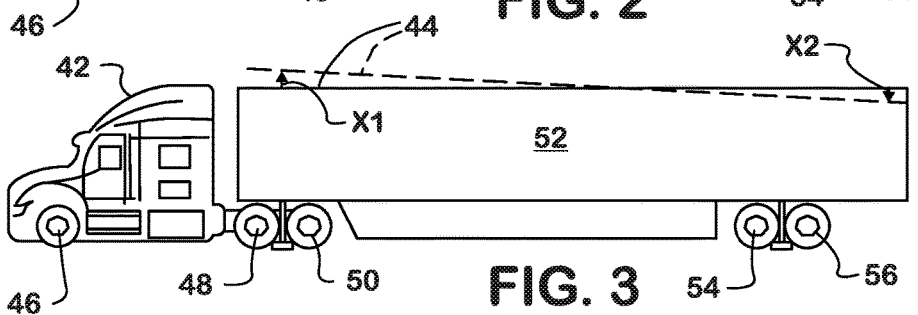
FIG. 3 is a side elevation view of the tractor-trailer showing a setting of suspension ride heights for the same axles as in FIG. 2 which increases pitch of the trailer.
Figure 4:
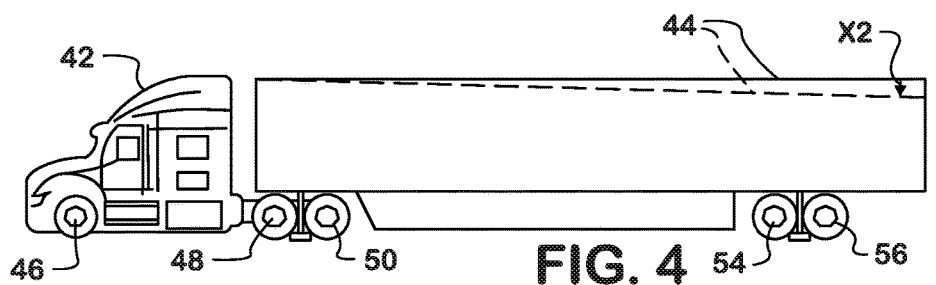
FIG. 4 is a side elevation view of the tractor-trailer showing another setting of suspension ride heights for the same axles as in FIG. 2 which increases pitch of the trailer.

FIGS. 3 and 4 show two respective examples of how trailer pitch can be controlled. One way of quantifying trailer pitch is by the settings of the ride height of the trailer's rear axle suspension and the ride height of the tractor's rear axle suspension relative to the baseline setting shown in FIG. 2. That way will be used in the following explanation.

FIG. 3 shows use of both the tractor rear drive axle's suspension and the trailer's rear axle suspension to control trailer pitch. When the pitch control increases pressure in the gas springs of the tractor rear drive axle's suspension, that suspension's ride height increases, increasing elevation of the rear of the tractor's chassis frame relative to the roadway underlying wheels 48, 50. When the pitch control decreases pressure in the gas springs of the trailer's rear axle suspension, that suspension's ride height decreases, decreasing elevation of the rear of the trailer's chassis frame relative to the roadway.

If the pitch angle is initially set to the baseline example in FIG. 2, progressively increasing the ride height x1 of the tractor rear drive axle's suspension in coordination with progressively decreasing the ride height x2 of the trailer rear axle suspension as suggested by FIG. 3, progressively increases the pitch angle. The pitch angle can be returned to baseline setting by reducing ride height x1 and increasing ride height x2.

FIG. 4 shows use of only the rear axle suspension of the trailer to control trailer pitch. When the pitch control decreases pressure in the gas springs of that suspension, the suspension's ride height x2 decreases, decreasing elevation of the rear of the trailer's chassis frame relative to the roadway underlying wheels 54, 56. When the pitch control increases pressure in the gas springs, the suspension's ride height increases, increasing elevation of the rear of the trailer's chassis frame relative to the roadway.

If the pitch angle is initially at the baseline setting, progressively decreasing the ride height x2 as suggested by FIG. 4 progressively increases the pitch angle. Increasing the ride height can return the pitch angle to the baseline setting.

FIG. 4 is an example of trailer pitch control either when a tractor lacks a rear axle suspension for changing ride height or when the suspension of a tractor having such a suspension isn't used.

Figure 5:
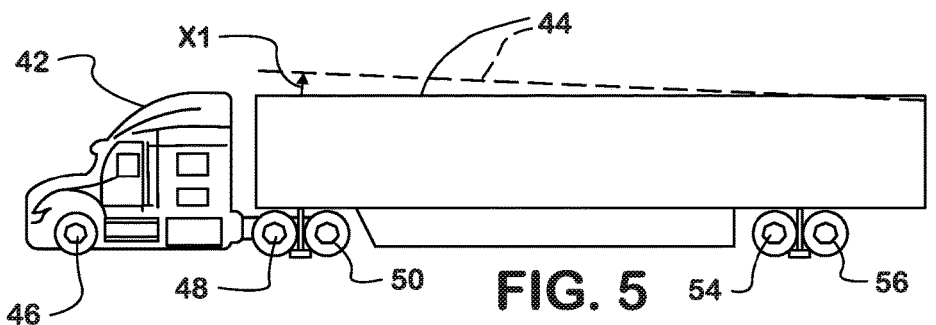
FIG. 5 is a side elevation view of the tractor-trailer showing a still another setting of ride heights for the same axles as in FIG. 2 which increases pitch of the trailer.

FIG. 5 shows another possibility in which pitch is changed from baseline setting only by increasing ride height of the tractor's rear axle suspension.

A system for controlling pressure in gas springs may be located entirely in a tractor or entirely in a trailer, or one portion of a system in the tractor and another portion in the trailer. Speed of travel can be obtained from any convenient speed data source, such as a data bus in a tractor or ABS wheel speed sensors in a trailer.

Figure 6:
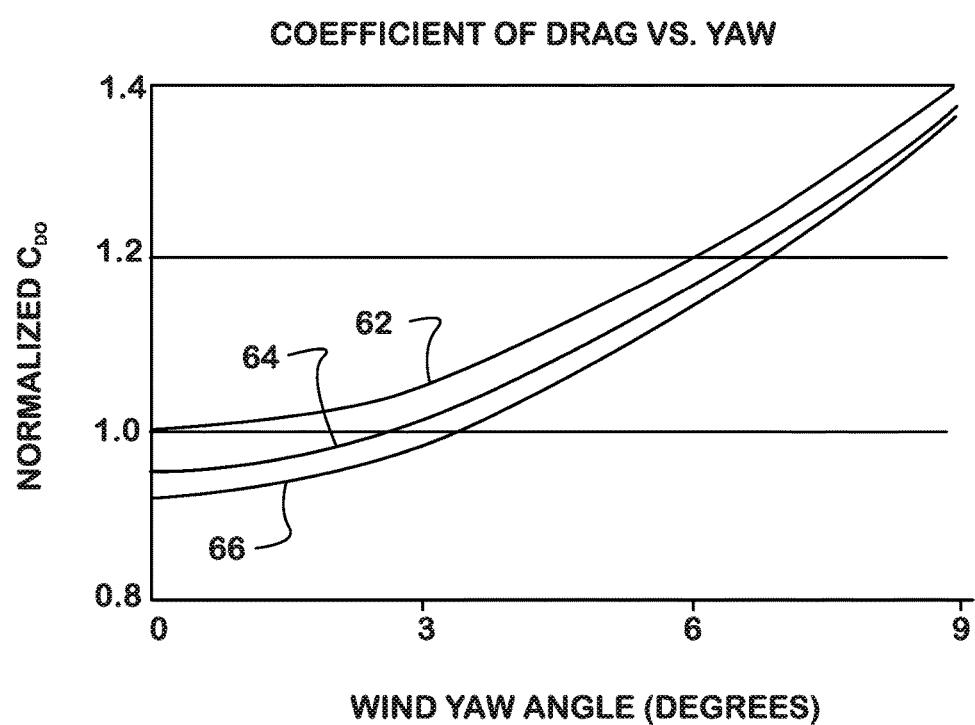
FIG. 6 is a graphic portrayal of drag reduction for two of the settings mentioned above.

FIG. 6 is a graphic which shows a general tendency for increased trailer pitch to reduce drag of a moving tractor-trailer traveling at typical highway speeds when wind yaw angle is relatively small. As the angle increases, drag reduction becomes less. A trace 62 characterizes the baseline shown in FIG. 2. A trace 64 characterizes the pitch setting shown in FIG. 4, and a trace 66 characterizes the pitch setting shown in FIG. 3

Trailer pitch control is performed by a controller which sets suspension ride heights based on traveling speed of a tractor-trailer and possibly other operating conditions. As traveling speed approaches highway speeds, the controller will automatically issues commands to the suspension, or suspensions, involved as explained above. In FIG. 4 for example, the trailer pitch control controls pitch of the trailer by decreasing ride height of the trailer's rear axle suspension to make pitch of the trailer greater than baseline when speed of travel of the tractor-trailer is greater than a speed threshold and by increasing ride height of the trailer's rear axle suspension to return pitch of the trailer to baseline when speed of travel of the tractor-trailer is less than the speed threshold.

Data from the Global Positioning System can also be used to allow the pitch control to be active when a tractor-trailer is present on certain roadways, such as on U.S. Interstate highways where pitch may be significantly increased. At slow speeds, the suspension or suspensions may be returned to their nominal (baseline) ride heights for maneuverability and ground clearance.

What is claimed is:

1. A tractor-trailer comprising:
    a tractor comprising a tractor chassis having a tractor chassis frame, right and left front wheels suspended from the tractor chassis frame, and right and left rear wheels suspended from the tractor chassis frame by a tractor rear suspension;
    a trailer comprising a trailer chassis frame, right and left rear wheels which are suspended from the trailer chassis frame by a trailer rear suspension;
    a coupling via which the trailer is coupled to the tractor chassis frame at a location overlying the right and left rear wheels of the tractor for towing by the tractor;
    at least one of the rear suspensions comprising at least one gas spring which is compressed along an axis by motion of at least one of the rear wheels toward the respective chassis frame and which expands along the axis with motion of at least one of the rear wheels away from the respective chassis frame, and a ride height control for setting ride height of the at least one of the rear suspensions to a desired ride height within a range of ride heights by setting internal pressure of the at least one gas spring; and
    a trailer pitch control which controls pitch of the trailer by setting ride height of the at least one of the rear suspensions as a function of speed of travel of the tractor-trailer.

2. A tractor-trailer as set forth in claim 1 in which the trailer pitch control controls pitch of the trailer also as a function of data concerning a roadway on which the tractor-trailer is traveling.

3. A tractor-trailer as set forth in claim 2 in which the data concerning a roadway on which the tractor-trailer is traveling is derived from wireless data which is received from the Global Positioning System and discloses geographic location of the tractor-trailer.

4. A tractor-trailer as set forth in claim 1 in which the trailer pitch control controls pitch of the trailer by decreasing ride height of the trailer rear suspension to make pitch of the trailer greater than a baseline when speed of travel of the tractor-trailer is greater than a speed threshold and when speed of travel of the tractor-trailer becomes less than the speed threshold, returns pitch of the trailer to the baseline.

5. A tractor-trailer as set forth in claim 1 in which the trailer pitch control controls pitch of the trailer by both increasing ride height of the tractor rear suspension relative to a baseline and decreasing ride height of the trailer rear suspension relative to the baseline when speed of travel of the tractor-trailer is greater than a speed threshold, and when speed of travel of the tractor-trailer becomes less than the speed threshold, the trailer pitch control returns ride height of the tractor rear suspension and ride height of the trailer rear suspension to the baseline.

6. In a tractor-trailer comprising a chassis having a chassis frame, a suspension which suspends an axle from the chassis frame and comprises at least one gas spring which is compressed along an axis by motion of the axle toward the chassis frame and which expands along the axis with motion of the axle away from the chassis frame, and a ride height control for setting ride height of the suspension to a desired ride height within a range of ride heights by setting internal pressure of the at least one gas spring;
    a method for setting pitch of the trailer by causing the ride height control to set ride height of the suspension which increases pitch of the trailer from a baseline when the tractor-trailer is traveling at a speed greater than a speed threshold and which returns pitch of the trailer to the baseline when the tractor-trailer speed becomes less than the speed threshold.

7. In a tractor-trailer, the method as set forth in claim 6 comprising setting pitch of the trailer by causing the ride height control to set ride height of a suspension of a rear axle of the tractor which increases pitch of the trailer from the baseline when the tractor-trailer is traveling at a speed greater than the speed threshold and which returns pitch of the trailer to the baseline when the tractor-trailer speed becomes less than the speed threshold.

8. In a tractor-trailer, the method as set forth in claim 7 comprising setting pitch of the trailer by the ride height control also setting ride height of a suspension of a rear axle of the trailer.

9. In a tractor-trailer, the method as set forth in claim 6 comprising setting pitch of the trailer by causing the ride height control to set ride height of a suspension of a rear axle of the trailer which increases pitch of the trailer from the baseline when the tractor-trailer is traveling at a speed greater than the speed threshold and which returns pitch of the trailer to the baseline when the tractor-trailer speed becomes less than the speed threshold.

* * * * *